United States Patent [19]

Tatsuno et al.

[11] Patent Number: 5,223,191
[45] Date of Patent: Jun. 29, 1993

[54] DATA PROCESSING METHOD OF INJECTION MOLDING MACHINE

[75] Inventors: Michihiro Tatsuno; Takayoshi Shioiri, both of Nagano, Japan

[73] Assignee: Nissei Jushi Kogyo Kabushiki Kaisha, Sakaki, Japan

[21] Appl. No.: 737,481

[22] Filed: Jul. 30, 1991

[30] Foreign Application Priority Data

Aug. 4, 1990 [JP] Japan .................. 2-207190

[51] Int. Cl.$^5$ ............................. B29C 45/76
[52] U.S. Cl. .................. 264/40.1; 264/40.4; 264/245; 425/130; 425/145
[58] Field of Search ............. 264/40.1, 40.4, 40.5, 264/40.7, 255, 245; 425/130, 134, 135, 145, 140, 148, 149

[56] References Cited

U.S. PATENT DOCUMENTS

| | | | |
|---|---|---|---|
| 4,318,874 | 3/1982 | Lemelson | 264/255 |
| 4,525,134 | 6/1985 | McHenry et al. | 425/145 |
| 4,826,424 | 5/1989 | Arai et al. | 425/586 |
| 4,867,664 | 9/1989 | Fukuhara . | |

FOREIGN PATENT DOCUMENTS

| | | |
|---|---|---|
| 41-16794 | 9/1941 | Japan . |
| 63-44047 | 9/1988 | Japan . |
| 2-128822 | 5/1990 | Japan . |

Primary Examiner—Jill L. Heitbrink

[57] ABSTRACT

A data processing method of an injection molding machine detects predetermined physical amounts, for example, filling velocities V1, V2 and V3 relative to operations of a plurality of injection apparatuses successively when different materials to be molded are injected into a cavity of a single mold from a plurality of injection apparatuses to fill the cavity so that molding is performed, calculates a characteristic data concerning the sum total of the detected filling velocities V1, V2 and V3, and processes data on the basis of the characteristic data. The axis of abscissa of the characteristic data can take a time or a total capacity of the material successively filled into the mold. The data processing includes display processing for displaying the characteristic data with a graph and the displayed characteristic data is utilized for setting the molding condition and the data analysis.

8 Claims, 3 Drawing Sheets

DATA PROCESSING METHOD OF INJECTION MOLDING MACHINE

1. FIELD OF THE INVENTION

The present invention relates to a data processing method of an injection molding machine for performing multi-color molding by a plurality of injection apparatuses.

2. DESCRIPTION OF THE RELEVANT ART

An injection molding machine in which different materials to be molded can be injected into a cavity of a single injection mold to fill the cavity so that a laminated sandwich molded product, a multi-color molded product and the like are manufactured is known in, for example, Japanese Patent Publication Nos. 63-44047 and 41-16794.

When the sandwich molded product is manufactured, the filled state of previously injected materials to be molded influences the subsequent injection and filling condition greatly. Accordingly, in order to manufacture the molded product stably, it is necessary to balance the rheology characteristic of the materials to be molded in the surface and core sides properly and control the molding condition for controlling a flowing state of the materials precisely. Therefore, for example, when the molding condition such as a set velocity, a set pressure or the like in one injection apparatus which previously performs the injection and filling operation, the molding condition of the other injection apparatus which performs the injection and filling operation subsequently is required to be changed.

Since usual data obtained in the molding operation is detected by the individual injection apparatus, the individual operation state of the injection apparatus can be grasped exactly but the relation to the molded state in the mold and the molded product can not be grasped exactly and easily. Accordingly, modification of the molding conditions is actually made in the trial and error manner while an operator confirms the actual molded product.

However, since it is necessary to grasp a plurality of injection operations in relation to each other in the manufacturing of the laminated sandwich molded product, the multi-color molded product and the like, the overall judgment depending on the experience of the operator has a limitation and this is difficult to be adopted in a factory or the like in which various molded products are manufactured successively. Further, the injection molding machine having a plurality of injection apparatuses has a problem that exact setting and correction of the molding condition is difficult and the investigation of causes of the molding failure by data analysis is also difficult.

SUMMARY OF THE INVENTION

It is an object of the present invention to provide a data processing method of an injection molding machine capable of grasping, setting and changing results of a molding condition to make exact setting thereof and performing setting operation easily and quickly to thereby eliminate dispersion by operator and to improve operation efficiency and to make high-quality molding even when different materials are injected into a cavity of a single mold from a plurality of injection apparatuses to fill the cavity so that molding is performed.

Further, it is another object of the present invention to provide a data processing method of an injection molding machine capable of representing a complicated molding process with the overall data to utilize the investigation of a cause of an inferior product, the analysis of the process, the design of a new mold and the like effectively.

In order to achieve the above objects, the data processing method of the present invention detects predetermined physical amounts, for example, filling velocities $V1$, $V2$ and $V3$ relative to operations of a plurality of injection apparatuses 1, 2 and 3 successively when different materials to be molded are injected into a cavity of a single mold 4 by the plurality of injection apparatuses 1, 2 and 3 to fill the cavity so that molding is performed, calculates a characteristic data $Dv$ concerning the sum total of the detected filling velocities $V1$, $V2$ and $V3$, and displays or records the characteristic data $Dv$. In this case, the axis of abscissa can take a time $t$ or a total capacity $Q$ of material successively filled into the mold 4.

Thus, the filling velocities $V1$, $V2$ and $V3$ which are the predetermined physical amounts relative to the operations successively detected from the injection apparatuses 1, 2 and 3 are all added to obtain the characteristic data $Dv$ concerning the sum total of the filling velocities $V1$, $V2$ and $V3$. When the characteristic data $Dv$ is displayed (data processing) with a graph since the characteristic data $Dv$ includes information of the actual filling state of the mold 4, the data can be grasped collectively and setting of the molding condition and data analysis can be made.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention is now described in detail with reference to the accompanying drawings.

Figure 4:
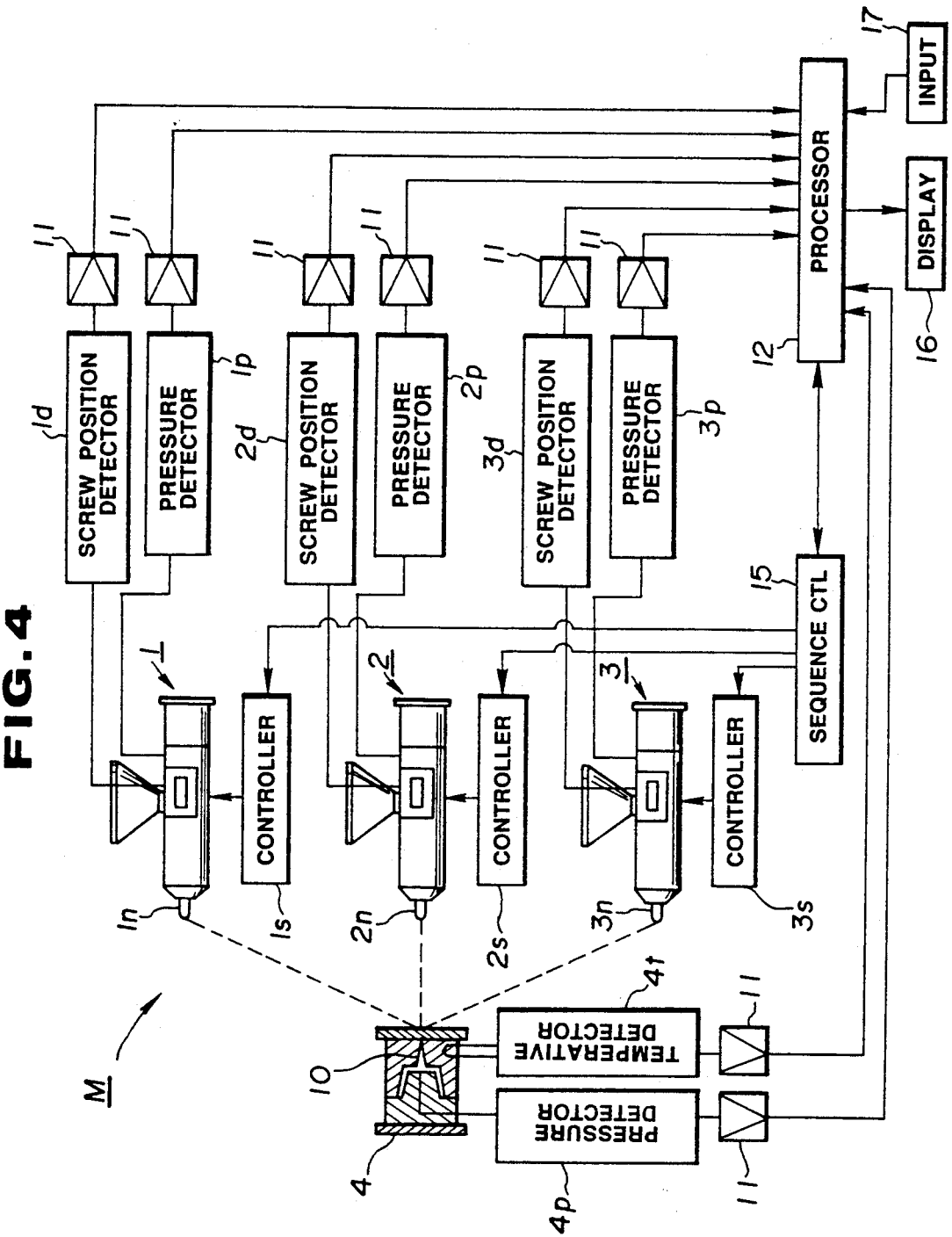
FIG. 4 is a block system diagram showing a main portion of a control system of an injection molding machine capable of implementing the data processing method.

First of all, a configuration of a control system of an injection molding machine is described with reference to FIG. 4.

An injection molding machine designated by reference M includes three injection apparatuses 1, 2 and 3 and a single mold 4. Nozzle portions 1n, 2n and 3n disposed at the top ends of the injection apparatuses 1, 2 and 3 are disposed so that the nozzle portions can be connected to a common sprue portion 10.

The injection apparatuses 1, 2 and 3 include screw position detectors 1d, 2d and 3d for detecting a screw position which is a physical amount relative to operation of each of the injection apparatuses and pressure detectors 1p, 2p and 3p for detecting injection pressures P1, P2 and P3 which are physical amounts relative to operation of each of the injection apparatuses, respectively. The detectors 1d, ... and 1p, ... are connected to a processor 12 through amplifiers 11, ... and 11, ... On the other hand, the mold 4 is provided with a temperature detector 4t for detecting a temperature and a pressure detector 4p for detecting a pressure which are physical amounts relative to the mold 4, and both of the detectors are also connected to the processor 12.

Further, each of the injection apparatuses 1, 2 and 3 is provided with an actuator (not shown) for driving the screw included in each of the injection apparatuses, and each of the actuator is controlled by each of controllers 1s, 2s and 3s. The controllers 1s, 2s and 3s are connected through a sequence controller 15 to the processor 12.

Furthermore, the processor 12 is connected to a display unit 16 and an input unit 17.

Accordingly, detected results of the detectors 1d, 2d, 3d, 1p, 2p, 3p, 4t and 4p are supplied to the processor 12 and the feedback control system in which the controllers 1s, 2s and 3s are controlled by the processor 12 and the sequence controller 15 is configured. Further, the molding condition and the like can be inputted by the input unit 17 and various data can be displayed by the display unit 16.

The data processing method according to the present invention is now described with reference to FIGS. 1 to 3.

In the molding operation, the screw positions and the injection pressures P1, P2 and P3 which are the physical amounts relative to the operations of the injection apparatuses 1, 2 and 3 are detected successively or at intervals of predetermined times by the screw position detectors 1d, 2d and 3d and the pressure detectors 1p, 2p and 3p, respectively. The detected screw position signals are converted into the screw velocities, that is, the filling velocities V1, V2 and V3 of material to be molded. The filling velocities V1, V2 and V3 are displayed by the the display unit 16 individually and the injection pressures P1, P2 and P3 are displayed by the display unit 16.

Figure 1:
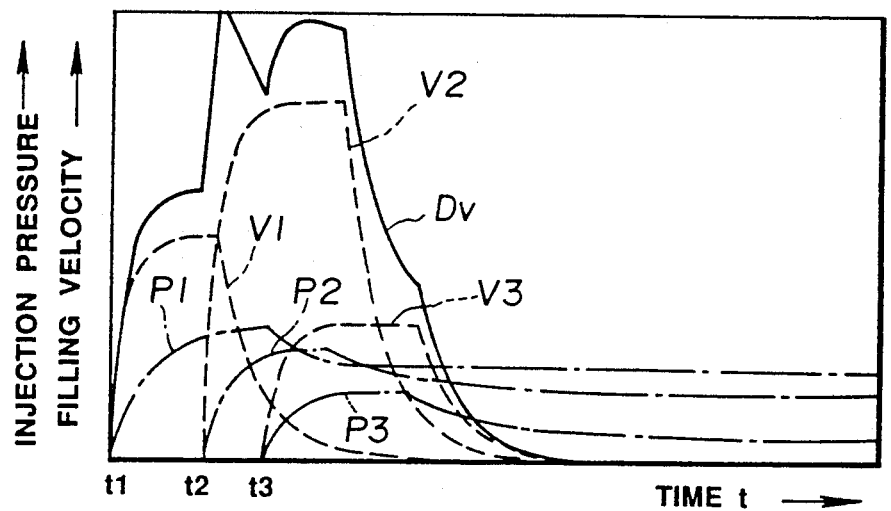
FIG. 1 is a display pattern diagram of the characteristic data obtained by the data processing method according to the present invention.

FIG. 1 displays the filling velocities V1, V2 and V3 and the injection pressures P1, P2 and P3 as they are with the axis of abscissa representing time t. In this case, the injection velocity V1, the screw velocity V2 and the screw velocity V3 rise from the times t1, t2 and t3, respectively, and the velocities are displayed in accordance with the operation timings of the individual injection apparatuses 1, 2 and 3.

On the other hand, the processor 12 adds all of the filling velocities V1, V2 and V3 in accordance with the present invention to calculate the characteristic data Dv by the sum total and displays it in the display unit 16. While not shown, the injection pressures P1, P2 and P3 are also added in the processor 12 similarly to calculate the characteristic data by the sum total which may be displayed similarly.

Figure 2:
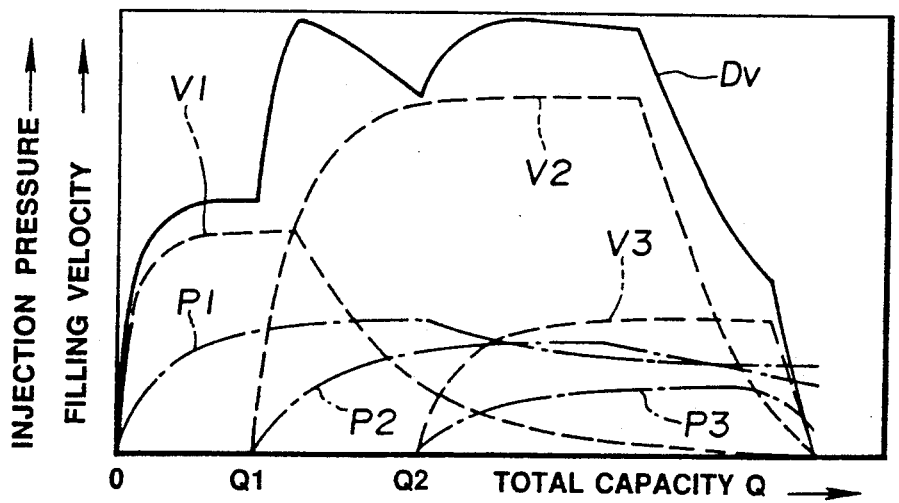
FIG. 2 is a display pattern diagram of other characteristic data obtained by the data processing method.

Further, FIG. 2 represents in the axis of abscissa a total capacity Q of the material filled successively into the mold. More particularly, if sectional areas and movement amounts of the screw of the injection apparatuses 1, 2 and 3 are X1, X2 and X3 and S1, S2 and S3, respectively, the total capacity Q of the material filled into the mold 4 can be calculated by the following equation.

$$Q = (X1 \cdot S1) + (X2 \cdot S2) + (X3 \cdot S3)$$

The total capacity Q at the beginning of injection of the injection apparatus 1 is zero and the total capacity Q at the beginning of injection of the injection apparatus 2 is Q1 injected from only the injection apparatus 1. The data for the injection apparatus 2 is displayed from Q1. The total capacity is the sum total of material injected from the injection apparatuses 1 and 2 after the total capacity reaches Q1, and the total capacity at the beginning of injection of the injection apparatus 3 is Q2. Consequently, the data for the injection apparatus is displayed from Q2.

Accordingly, with such a display, since the filling velocities V1, V2 and V3 of the injection apparatuses 1, 2 and 3 are all added to be the sum total, the injection situation in accordance with the filled capacity of the mold 4 can be grasped and the molding condition can be set and changed while looking at the displayed graph of the characteristic data Dv. Further, if the changed data is displayed in overlapped manner to the displayed graph before change, influences by the changed conditions can be judged collectively in relation to all of the injection apparatuses. The velocity change-over positions of the injection apparatuses 1, 2 and 3 are usually set at the screw positions of the injection apparatuses 1, 2 and 3, while the positions can be also set at a value of the total capacity Q.

Figure 3:
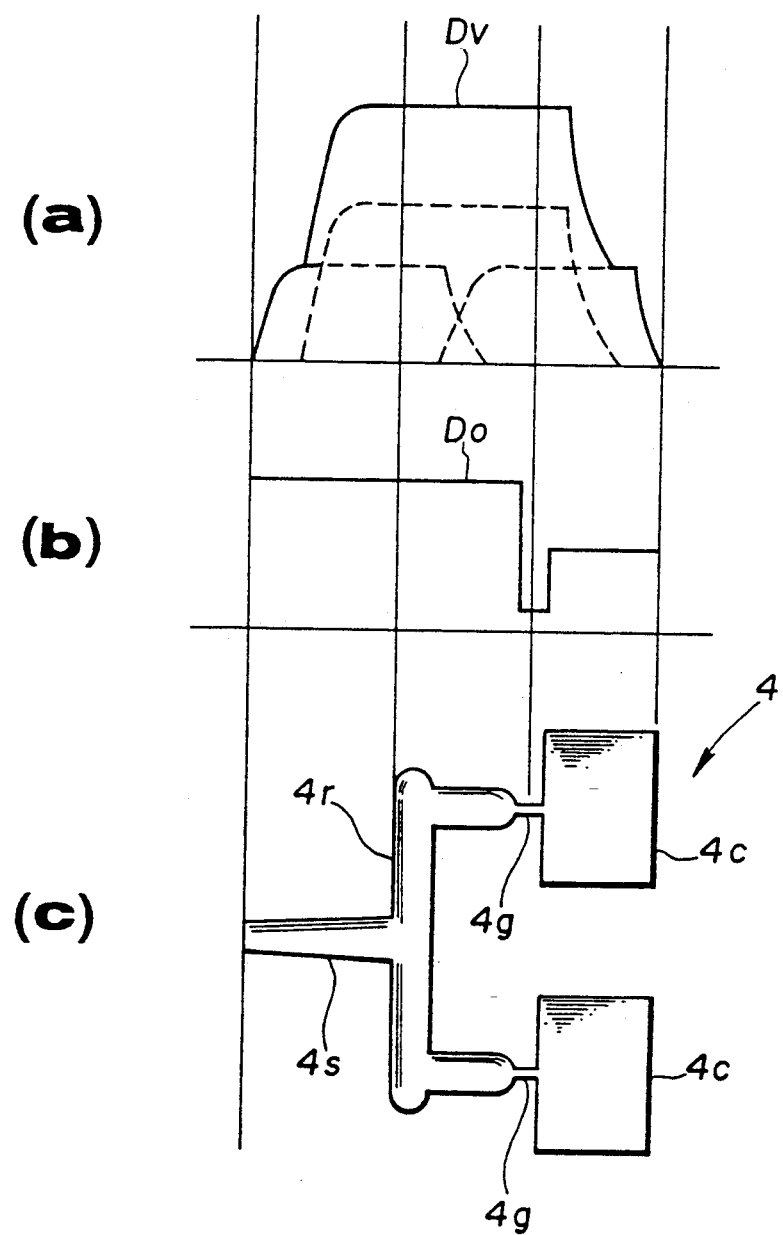
FIG. 3(a–c) is a diagram illustrating a utilization method of the characteristic data obtained by the data processing method.

FIG. 3(a-c) illustrates a more actual setting method. FIG. 3(a-c) shows the characteristic data DV of the filling velocity calculated in accordance with the present invention with regard to cavities 4c, gates 4g, a runner 4r and a sprue 4s and an ideal filling velocity characteristic Do for the shape of the mold. Actually, the characteristics data Dv and the filling velocity characteristic Do can be displayed on the display unit in the overlapped manner.

Accordingly, it is necessary to reduce the filling velocity of the material to be molded in the vicinity of the gate 4g, while since the actual filling velocity can be grasped at a glance by the characteristic data Dv displayed in accordance with the present invention, the velocity condition of the injection apparatuses 1, 2 and 3 can be set and changed easily. Further, when burr is formed in the molding portion at the sprue 4s, it is necessary to reduce the filling velocity of the material to be molded in the sprue 4s, while since the actual filling velocity can be grasped at a glance by the characteristic data Dv even in this case, the velocity condition of the injection apparatuses 1, 2 and 3 can be set and changed easily. Other points such as the velocity change-over point and the filling completion point are also detected easily.

The embodiment has been described in detail, while the present invention is not limited to such an embodiment. For example, any physical amount except the filling velocity and the injection pressure described in the embodiment may be utilized. Further, the data processing for the characteristic data includes not only display and recording but also necessary operation processing, analysis processing or the like. The detailed configuration, method and the like can be changed without departing from the spirit of the present invention.

We claim:

1. A method for controlling an injection molding machine comprising the steps of injecting different materials to be molded into a cavity of a single mold from a plurality of injection apparatuses to fill the cavity so that molding is performed, detecting predetermined physical amounts relative to operations of each of the injection apparatuses in the molding operation successively, calculating characteristic data by a sum total of the detected physical amounts, processing data on the basis of the characteristic data, displaying in real-time both the characteristic data and the physical amounts together on graphs and using the displayed graphs to control subsequent injections of materials during the molding.

2. The method for controlling an injection molding machine according to claim 1, wherein said physical amounts includes a filling velocity of the material to be molded.

3. The method for controlling an injection molding machine according to claim 1, wherein said physical amounts includes an injection pressure.

4. The method for controlling of an injection molding machine according to claim 1, wherein an axis of abscissa of the graphs for the characteristic data is a time.

5. The method for controlling of an injection molding machine according to claim 1, wherein an axis of abscissa of the graphs for the characteristic data is a total capacity of the material filled into the mold successively.

6. The method for controlling an injection molding machine according to claim 1, wherein the physical amounts detected are screw position and injection pressures for each of the injection apparatuses and further comprising the steps of detecting temperature and pressure of the single mold and supplying the screw positions, injection pressures, mold temperature and mold pressure to a processor whereat the characteristic data is calculated.

7. The method for controlling an injection molding machine according to claim 6, further comprising the steps of:

providing each of the injection apparatuses with a controller; and controlling each of the controllers from the processor using feedback control such that screw position, injection pressure, mold temperature and mold pressure are used in operating each of the injection apparatuses.

8. The method for controlling an injection molding machine according to claim 1, further comprising the step of also displaying filling velocity characteristic on the graph in an overlapped manner, the filling velocity characteristic being a generally ideal filling velocity for shape of the mold whereby actual filling of the mold can be compared with ideal filling of the mold.

* * * * *